United States Patent [19]

Richardson

[11] Patent Number: 4,662,077

[45] Date of Patent: May 5, 1987

[54] COMBINED STORY POLE AND ELEVATION ROD

[76] Inventor: Don Richardson, 10730 Villa Lea, Houston, Tex. 77071

[21] Appl. No.: 850,060

[22] Filed: Apr. 10, 1986

[51] Int. Cl.$^4$ .............................................. G01C 15/00
[52] U.S. Cl. ......................................... 33/296; 33/161
[58] Field of Search .................. 33/161, 293, 295, 451, 33/464, 452, 454, 483, 296

[56] References Cited

U.S. PATENT DOCUMENTS

| | | | |
|---|---|---|---|
| 1,272,976 | 7/1918 | McLucus | 33/161 |
| 3,190,008 | 6/1965 | Weiss | 33/161 |
| 3,374,545 | 3/1968 | Monroe | 33/161 |
| 3,492,737 | 2/1970 | Swanson | 33/161 |
| 4,471,532 | 9/1984 | Francis | 33/161 |

FOREIGN PATENT DOCUMENTS 871520  2/1953  Fed. Rep. of Germany ........ 33/161

Primary Examiner—Willis Little
Attorney, Agent, or Firm—Mark G. Bocchetti; Bernard A. Reiter

[57] ABSTRACT

Disclosed is a combination tool useful to a variety of building trades in building erection. The tool can be used as a story pole, a surveyor's rod, an extensible measuring device, a plumb and a horizontal level. When used as a measuring device, story pole or surveyor's grade rod, the tool of the present invention provides direct read capabilities eliminating the need for computations which in turn prevents errors in arithmetic commonly made when using tools of the prior art. The tool is particularly efficient for use in setting and erecting commercial store fronts typically constructed of aluminum and glass and effectively replaces at least five separate tools commonly used by the building trades.

12 Claims, 5 Drawing Figures

COMBINED STORY POLE AND ELEVATION ROD

BACKGROUND OF THE INVENTION

1. Field of the Invention

The present invention relates generally to measuring rules and more particularly, to vertically extensible story poles and elevational grade rods.

2. Brief Description of the Prior Art

There are in the prior art a variety of vertical measuring devices. One such device is shown in U.S. Pat. No. 1,614,577 to Tetrick. Tetrick apparently teaches an expansion story-pole which can be used for measuring height, leveling, plumbing and spacing. The Tetrick device does not teach story pole which is direct read. Some calculation is needed in order to determine the vertical-height measure. It is also noted that the Tetrick device cannot be used as a direct read elevation rod.

Another extensible measuring device is depicted in U.S. Pat. No. 3,094,787 to Moore. The Moore rule does not provide direct read capabilities and further, it cannot be used as a direct read horizontal grade rod. Moore merely teaches a telescoping measuring rule comprised of a plurality of angle sections.

U.S. Pat. No. 4,099,331 to Peterson et al. is directed to another extensible measuring device. The Peterson et al device incorporates a vertically extendable slide which engages a wheel which is rotated in response to the movement of the vertical slide. The wheel acts as a counter to measure the distance which the vertical slide is extended. Such distance must be read and then added to the length of the tool. Therefore, Peterson et al does not provide a direct read story pole. Further, the Peterson et al device cannot be used as a direct read horizontal grade rod.

Another telescoping measuring rule is taught in U.S. Pat. No. 4,399,616 to Jansson. The Jansson device containes two scales, one for taking outside measurements and one for taking inside measurements. Apparently, the Jansson rule can be used to take a direct reading when utilizing the inside measurement scale. However, there is no way that the Jansson rule can be used as direct read horizontal grade rod.

SUMMARY OF THE INVENTION

It is therefore an object of the present invention to provide a direct read story pole for measuring vertical heights requiring no arithmetic steps to determine the height measured.

It is further object of the present invention to provide a direct read grade rod which requires essentially no arithmetic steps to determine variances between elevation measured and elevation desired.

Yet another object of the present invention is to provide a combination tool which is particularly useful in the setting and installation of commercial store fronts and the like.

A further object of the present invention is to provide a combination tool for measuring elevations and vertical heights which has incorporated therein a leveling device to ensure that the tool is maintained in substantially vertical position when measurements are taken.

Still another object of the present invention is to provide a combination tool which can be used as a vertical plumb line.

A further object of the present invention is to provide a combination tool which can be used as a horizontal level.

Briefly stated, the foregoing and numerous other features, objects and advantages of the present invention will become readily apparent upon a reading of the detailed description, claims and drawings set forth hereinafter and are accomplished by providing a columnar member with a vertical slot therein which serves to furnish slidable residence for a scale support member. The support member has mounted thereto two separate rules. The first rule is used primarily for obtaining or setting vertical measurements such as from floor to ceiling. The tool is held in substantially vertical position with its base against the floor and the slidable support member is maneuvered such that the first rule comes in contact with the ceiling. The rule can then be read directly for the precise measurement from floor to ceiling with no arithmetic required.

The second rule is a direct read grade rod and is used in conjunction with a surveyor's level. The surveyor's level is set up and the base of the tool is placed on a point of known elevation. The second rule or scale on the tool is sighted with the surveyor's level and the rule is maneuvered vertically such that it reads the known elevation. At that point, the vertical slide is tightened such that it will not move and future readings taken through the surveyor's level with the tool at different points will show the actual elevation of those points without any arithmetic required.

Regardless of which rule is being used, the tool is maintained in substantially vertical position with the aid of a bubble-type level. This ensures that any vertical measurements or grade elevations taken will be accurate.

The bubble-type or target level also allows the tool to function as a plumb line. A second bubble-type or target level allows the tool as a horizontal level.

DESCRIPTION OF THE PREFERRED EMBODIMENT

Figure 1:
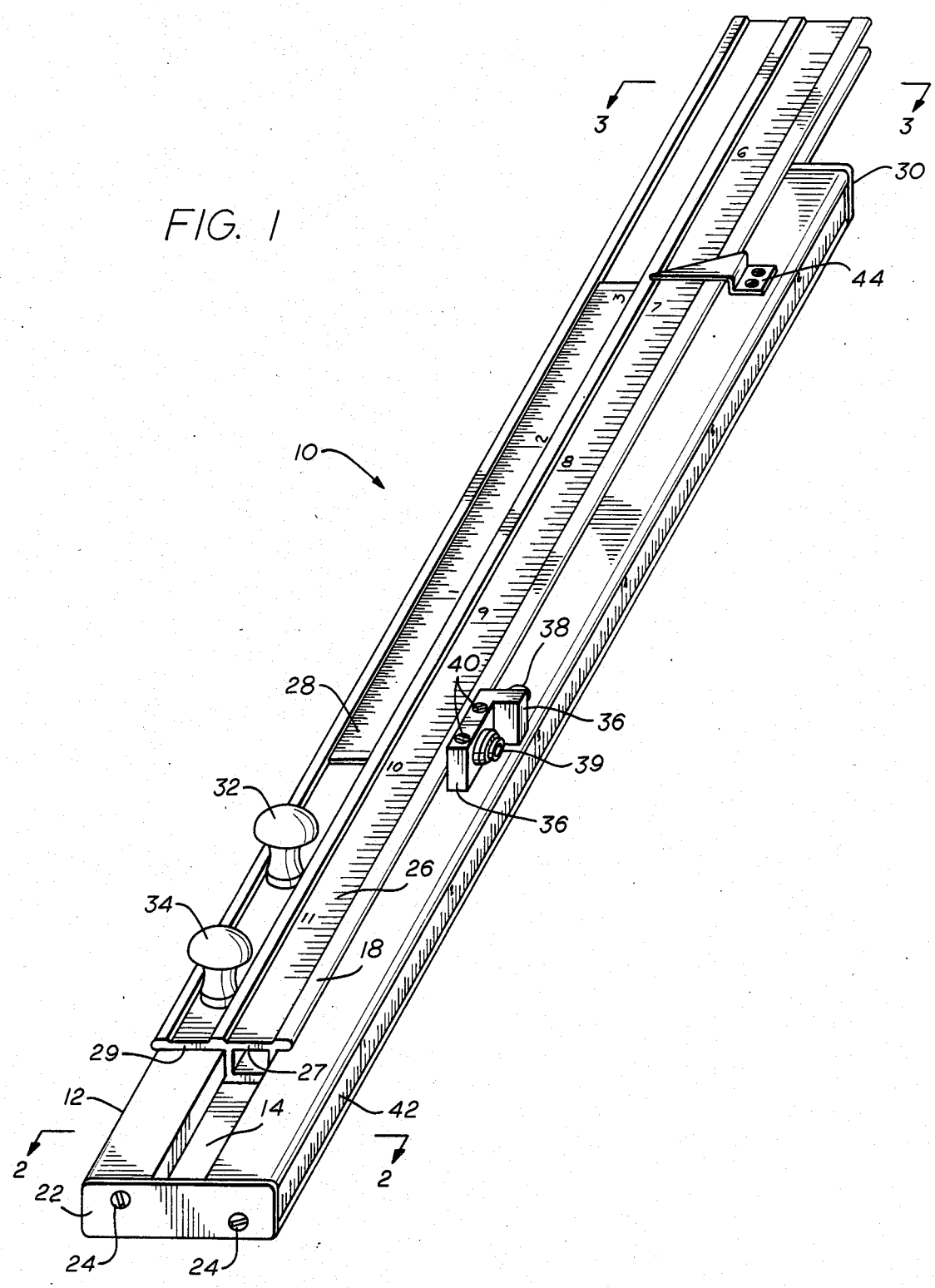
FIG. 1 is an isometric view of the combination tool of the present invention.
Figure 3:
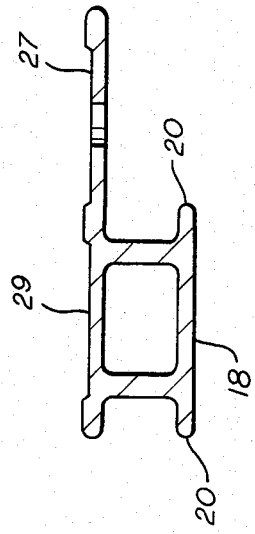
FIG. 3 is a section view of the slide member taken along line 3—3 of FIG. 1.
Figure 5:
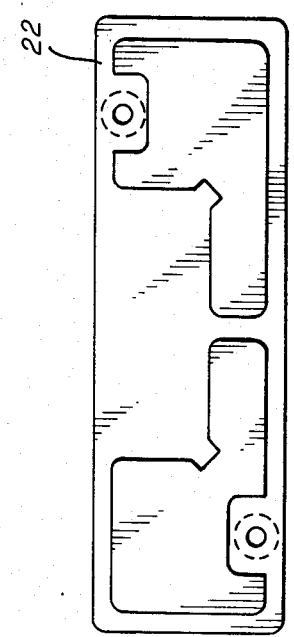
FIG. 5 is a plan view of the bottom plate.
Figure 2:
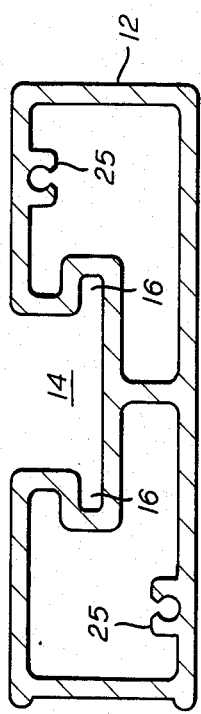
FIG. 2 is a section view of the main columnar member taken along line 2—2 of FIG. 1.
Figure 4:
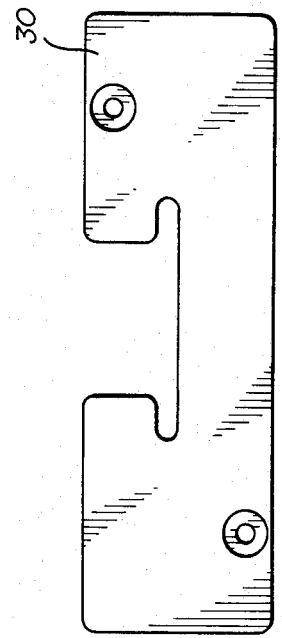
FIG. 4 is a plan view of the top plate.

Turning first to FIG. 1 there is shown the combination tool 10 of the present invention. The combination tool 10 is comprised of a columnar support member 12 which has provided therein, channel 14. Channel 14 is substantially T-shaped with the T inverted thereby providing groove ears 16.

Mounted within channel 14 is slide member 18. The base of slide member 18 has two horizontally extending ears 20 which reside in groove ears 16. In such manner, slide member 18 is slidably mounted to columnar member 12. Base plate 22 is attached to columnar member 12 by means of screws 24. Base plate 22 provides a lower stop for slide member 18.

Screws 24 thread into columnar member 12 at receptacles 25. Receptacles 25 are formed as a continuous part of the extrusion when columnar member 12 is manufactured. In such manner, receptacles 25 run the length of columnar member 12 thereby providing similar mounting means for top plate 30.

Mounted longitudinally on slide member 18 are vertical height rule 26 and elevation rule 28. Vertical height rule 26 and elevation rule 28 reside in indentations 27 and 29 respectively in slide member 18. Rules 26 and 28 are steel tape type rules and are adhesively attached to slide member 18. Mounted to the top of columnar support member 12 is top plate 30.

Knobs 32 and 34 threadably engage slide member 18, the bores in slide member 18 passing entirely therethrough such that knobs 32 and 34 can be screwed to engage the surface of columnar member 12. Manipulating knobs 32 and 34 to engage columnar member 12 prevents slide member 18 from moving within channel 14 such that the position of slide member 18 becomes fixed.

There is mounted to the surface of columnar member 12 an L-shaped block 36. Block 36 supports a vertical, bubble-type, target level 38 and a horizontal, bubble-type, target level 39 which can be used in manipulating the tool 10 such that it is substantially vertical or substantially horizontal. Block 36, being L-shaped serves as some measure of protection for levels 38 and 39. Block 36 is mounted to columnar member 12 by means of screws 40. It should also be understood that vertical, bubble-type level 38 allows combination tool 10 to be used to plumb vertical members. When used in such manner, the combination tool presents a significant advantage over a plumb bob in that its accuracy will be uneffected by the wind. For the purpose of taking additional measurements that do not require an extensible rule, there is attached to one side of columnar member 12 a third rule 42 which is always fixed in relationship to columnar member 12.

Mounted at substantially eye level to columnar member 12 is indicator 44. Indicator 44 is used to read any measurements taken with the tool 10 using rule 26. Whether the measurement be horizontal or vertical, base 22 is placed at one end of the distance to be measured and slide member 18 is manipulated such that the top of slide member 18 engages the opposite end of the distance to be measured. Rule 26 is then read at indicator 42 to display the actual distance measured with no calculation necessary. In order to accomplish this, it is necessary to mount vertical height rule 26 to slide member 18 such that it reads the height of columnar member 12 when slide member 18 resides in abutting position to base plate 22. Further, vertical height rule 26 must be positioned such that the numbers on the rule 26 increase toward base plate 22. Therefore, the lowest measurement readable with slide member 18 is, of course, equivalent to the overall length of columnar member 12.

Elevation rod rule 28 is a more typical type rule in that it runs from 0 to 3 feet or whatever particular overall length is selected for elevation rule 26. To use elevation rule 26, base plate 22 is placed on a point of known elevation and tool 10 is maintained in substantially vertical position with the aid of vertical level 38. A surveyor's level is then used to sight elevation rule 28 and the surveyor's level operator instructs the person holding combination tool 10 to manipulate slide member 18 such that the surveyor's level operator reads the known elevation of the point on elevation rule 28. In other words, the surveyor's level operator reads elevation rule 28 through the level. He then instructs the person holding combination tool 10 to vertically maneuver slide member 18 so that the elevation read through the surveyor's level on elevation rule 28 is equivalent to the known elevation of the point on which base plate 22 has been set. At that point, knobs 32 and 34 are tightened such that they engage the surface of columnar member 12 restricting further movement of slide member 18. The elevation of other nearby points can then be measured by using the combination tool as a surveyor's rod sighting elevation rule 28 through a surveyor's level. Having set elevation rule 28 to read the exact elevation of a known point, the difference in elevation of other points measured will be easily be determined merely by reading elevation rule 28. The usual calculation associated with determining grade using a surveyor's rod are avoided. Consequently, there is also avoided the potential for errors in making such calculations. For example, if the known elevation was set to be two feet, then, when measuring the elevation of nearby points, the operator of the surveyor's level would know automatically the difference in elevation from two feet.

Columnar member 12 and slide member 18 are preferably constructed from extruded aluminum. Constructed of such material, combination tool 10 becomes lightweight and durable. Base plate 22 and top plate 30 are preferably constructed of a semi-rigid, plastic material but may also be constructed of aluminum or other rigid materials. Constructing base plate 22 and top plate 30 from semi-rigid plastic materials should help in preventing the marking or gouging of floors, ceilings and walls when combination tool 10 is being used to take measurements.

The combination tool 10 of the present invention is useful to a variety of trades or crafts in the field of commercial construction. It is particularly useful in setting and erecting aluminum and glass store fronts typically used for commercial shopping centers. The tool would also be valuable to framers, brick masons and carpenters as well as those workers who erect curtain walls and suspended ceilings.

The combination tool 10 of the present invention efficiently replaces the need for at least five commonly used tools. Further, its direct read capabilities effectively eliminate the typical computations which must be performed in using some of the tools replaced by the present invention.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A tool for measuring distances, reading elevations, leveling and plumbing comprising:
    (a) a main support member having a longitudinal channel therein;
    (b) a rule support member slidably engaged with said main support member in said longitudinal channel;
    (c) an extensible measuring rule affixed to said rule support member;

(d) an elevation grade rule affixed to said rule support member parallel and laterally adjacent to said extensible measuring rule;

(e) an indicator means for reading said extensible measuring rule.

2. A tool for measuring distances, reading elevations, leveling and plumbing as recited in claim 1, further comprising: a first target-type level mounted to said main support member to aid in maintaining said tool in substantially vertical position when said tool is being used to take vertical measurements and to read elevations, said first target-type level also allowing said combination tool to function as a plumb.

3. A tool for measuring distances, reading elevations, leveling and plumbing as recited in claim 2, further comprising; a second target-type level mounted to said main support member to aid in maintaining said tool in substantially horizontal position when said tool is being used to take horizontal measurements, said second target-type level also allowing said tool to be used as a horizontal level.

4. A tool for measuring distances, reading elevations, leveling and plumbing as recited in claim 1, wherein: said measuring rule is a direct read rule at said indicator means so that no computations are necessary to determine the distance measured, said indicator means being located substantially at eye level.

5. A tool for measuring distances, reading elevations, leveling and plumbing as recited in claim 4, wherein: said elevation grade rule can be positioned by maneuvering said rule support member so that when said elevation grade rule is read through a surveyor's level, said elevation grade rule can be set to read a desired elevation, thereby allowing said elevation and grade rule to be a direct read scale.

6. A tool for measuring distances, reading elevations, leveling and plumbing as recited in claim 5, further comprising: a base plate which serves as a lower travel stop for said rule support member.

7. A tool for measuring distances, reading elevations, leveling and plumbing as recited in claim 6, further comprising: locking means for fixing the position of said rule support member within said main support member when said combination tool is used to read grade elevations.

8. A tool for measuring distances, reading elevations, leveling and plumbing as recited in claim 7, further comprising: a third measuring rule affixed to a side of said main support member.

9. A tool for measuring distances, reading elevations, leveling and plumbing as recited in claim 4, wherein: said extensible measuring rule reads the length of said main support member at said indicator means when said rule support member is positioned to abut said base plate.

10. A tool for measuring distances, reading elevations, leveling and plumbing as recited in claim 9, wherein: said main support member is made for extruded aluminum.

11. A tool for measuring distances, reading elevations, leveling and plumbing as recited in claim 10, wherein: said rule support member is made from extruded aluminum.

12. A tool for measuring distances, reading elevations, leveling and plumbing comprising:
(a) a main support member having a longitudinal channel therein;
(b) a scale support member slidably engaged with said main support member in said longitudinal channel;
(c) a measuring scale affixed to said scale support member, said measuring scale having upper and lower ends;
(d) an elevation grade scale affixed to said scale support member parallel and laterally adjacent to said measuring scale;
(e) an indicator means located substantially at eye level for reading said measuring scale, said measuring scale reading from a first value equal to the distance between said lower end and said indicator means to a second value equal to two times the distance between said lower end and said indicator means.

* * * * *